(12) United States Patent
Kung

(10) Patent No.: US 9,727,179 B2
(45) Date of Patent: Aug. 8, 2017

(54) TOUCH APPARATUS AND TOUCH SENSING METHOD THEREOF

(71) Applicant: Industrial Technology Research Institute, Hsinchu (TW)

(72) Inventor: Chen-Pang Kung, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 282 days.

(21) Appl. No.: 14/151,821

(22) Filed: Jan. 10, 2014

(65) Prior Publication Data

US 2014/0320447 A1 Oct. 30, 2014

(30) Foreign Application Priority Data

Apr. 30, 2013 (TW) .............................. 102115471 A

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/045* (2013.01); *G06F 3/0416* (2013.01); *G06F 2203/04102* (2013.01)

(58) Field of Classification Search
CPC ........ G06F 3/044; G06F 3/045; G06F 3/0416; G06F 2203/04102
See application file for complete search history.

(56) References Cited

U.S. PATENT DOCUMENTS

| 7,176,897 B2 | 2/2007 | Roberts |
| 7,965,835 B2 | 6/2011 | Park et al. |
| 2003/0214486 A1 | 11/2003 | Roberts |

(Continued)

FOREIGN PATENT DOCUMENTS

| TW | 200947289 | 11/2009 |
| TW | 201017494 | 5/2010 |

(Continued)

OTHER PUBLICATIONS

Lee et al., "Analysis of Thermo-Mechanical Behavior of ITO Layer on PET Substrate," 2011 IEEE 61st Electronic Components and Technology Conference (ECTC), May 31, 2011-Jun. 3, 2011, pp. 1796-1799.

(Continued)

*Primary Examiner* — Ilana Spar
*Assistant Examiner* — Brent D Castiaux
(74) *Attorney, Agent, or Firm* — Jianq Chyun IP Office

(57) ABSTRACT

A touch sensing method of a touch panel may include: defining at least one of at least one sensing loop as at least one reference sensing loop, wherein the sensing loop is disposed in the touch panel for sensing a touch event; providing a driving signal to the reference sensing loop in order to read at least one reference signal from the reference loop during an electrical detection period; providing the driving signal to the sensing loop in order to read at least one sensing signal from the sensing loop during a touch sensing period; and detecting a touch position of the touch event according to the reference signal and the sensing signal. Several touch apparatuses are also provided.

29 Claims, 9 Drawing Sheets

(56) References Cited

U.S. PATENT DOCUMENTS

| | | | |
|---|---|---|---|
| 2009/0167718 A1* | 7/2009 | Lee | G06F 3/0416 345/174 |
| 2009/0273573 A1* | 11/2009 | Hotelling | G06F 3/0362 345/173 |
| 2011/0205178 A1* | 8/2011 | Yoshida | G06F 1/1616 345/173 |
| 2011/0210937 A1 | 9/2011 | Kee et al. | |
| 2012/0044199 A1 | 2/2012 | Karpin et al. | |
| 2012/0154326 A1* | 6/2012 | Liu | G06F 3/0412 345/174 |
| 2012/0182259 A1 | 7/2012 | Han | |
| 2012/0229421 A1 | 9/2012 | Kim et al. | |
| 2014/0028596 A1* | 1/2014 | Seo et al. | G06F 3/0416 345/173 |

FOREIGN PATENT DOCUMENTS

| | | |
|---|---|---|
| TW | 201019184 | 5/2010 |
| TW | 201112066 | 4/2011 |
| TW | 201131435 | 9/2011 |
| TW | 201144824 | 12/2011 |
| TW | 201201069 | 1/2012 |
| TW | I386833 | 2/2013 |

OTHER PUBLICATIONS

Hamasha et al., "Stability of ITO Thin Film on Flexible Substrate Under Thermal Aging and Thermal Cycling Conditions,"Journal of Display Technology, Jul. 2012, pp. 385-390, vol. 8, No. 7.

Chiu et al., "Multi-touch Document Folding: Gesture Models, Fold Directions and Symmetries," Proceedings of the SIGCHI Conference on Human Factors in Computing Systems, May 7-12, 2011, pp. 1591-1600.

Kim et al., "Deformable single wall carbon nanotube electrode for transparent tactile touch screen," Electronics Letters, Jan. 20, 2011, pp. 118-120, vol. 47, No. 2.

Asano et al., "Flexible transparent touch panel mounted on round surface," 2012 IEEE 25th International Conference on Micro Electro Mechanical Systems (MEMS), Jan. 29, 2012-Feb. 2, 2012, pp. 567-570.

Ujiie et al., "Haptic Device Using Flexible Sheet by Tension and Touch Area Control," 2010 IEEE/SICE International Symposium on System Integration (SII), Dec. 21-22, 2010, pp. 396-401.

Ko et al., "Low Noise Capacitive Sensor for Multi-touch Mobile handset's applications," 2010 IEEE Asian Solid State Circuits Conference (A-SSCC), Nov. 8-10, 2010, pp. 1-4.

"Office Action of Taiwan Counterpart Application," issued on Apr. 23, 2015, p. 1-p. 6, in which the listed references were cited.

* cited by examiner

TOUCH APPARATUS AND TOUCH SENSING METHOD THEREOF

CROSS-REFERENCE TO RELATED APPLICATION

This application claims the priority benefit of Taiwan application serial no. 102115471, filed on Apr. 30, 2013. The entirety of the above-mentioned patent application is hereby incorporated by reference herein and made a part of this specification.

BACKGROUND

Technical Field

The disclosure relates to a touch apparatus and a touch sensing method thereof.

Related Art

In the application of consumer electronic products, the touch panel has been widely used in the portable electronic products, such as the smart phone, the laptop or the tablet computer. Currently, the touch panel has various types including the resistive touch panel, the capacitive touch panel, the surface acoustic wave (SAW) touch panel and the infrared touch panel, and the capacitive touch panel can be further classified into the projected capacitive touch panel, the surface capacitive touch panel and so on.

For the user, electronic products, such as e-books, with the characteristics of flexible, bendable and foldable are easy for carry and storage. Therefore, the touch apparatus has become one of the important components in the flexible electronic products. The substrate of the touch apparatus is also flexible, so it may be folded, rolled or bent during transportation, usage or storage. However, under the situation that the substrate is folded, rolled or bent, the thin-film material may be affected by the stress or the temperature, so that the material structure or the stacked structure is varied, which further leads to the change of the electrical characteristics of the sensing elements (such as the changes of the conductor resistance and the stacked capacitance). To the touch apparatus, the variation of the electrical characteristics of the sensing elements may lead to the abnormal situation such as mis-sensing happened in the touch sensing mechanism, so as to reduce the accuracy and the sensitivity on touch sensing.

SUMMARY

An embodiment of the disclosure provides a touch sensing method of a touch panel. The touch sensing method includes defining at least one of at least one sensing loop as at least one reference sensing loop, wherein the sensing loop is disposed in the touch panel in matrix arrangement and configured for sensing a touch event; providing a driving signal to the reference sensing loop in order to read at least one reference signal from the reference sensing loop during a electrical detection period; providing the driving signal to the sensing loop in order to read at least one sensing signal from the sensing loop during a touch sensing period; and detecting a touch position of the touch event according to the at least one reference signal and the at least one sensing signal.

An embodiment of the disclosure provides a touch apparatus including a touch panel and a detection unit. The touch panel includes at least one sensing loop, where the sensing loop is configured to detect a touch event, and at least of the at least one sensing loop is defined as at least one reference sensing loop. The detection unit is coupled to the touch panel for detecting a touch position of the touch event. When the touch panel is operated in an electrical detection period, the detection unit provides a driving signal to the reference sensing loop in order to read at least one reference signal from the reference sensing loop. When the touch panel is operated in a touch sensing period, the detection unit provides the driving signal to the sensing loop in order to read at least one sensing signal from the sensing loop. The detection unit detects the touch position of the touch panel according to the at least one reference signal and the at least one sensing signal.

In order to make the disclosure comprehensible, several exemplary embodiments accompanied with figures are described in detail below.

DETAILED DESCRIPTION OF DISCLOSED EMBODIMENTS

Figure 1A:
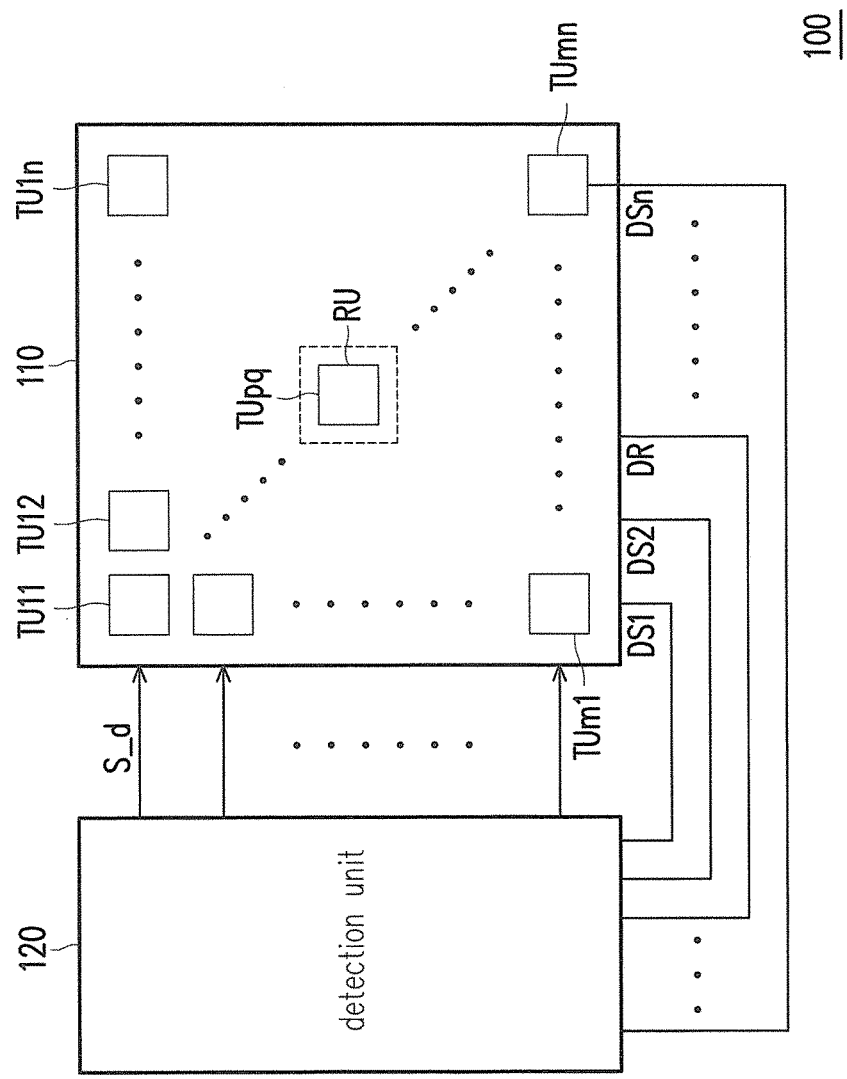
FIG. 1A is a schematic diagram illustrating a touch apparatus according to an embodiment of the disclosure.

The embodiment of the present disclosure provides a touch apparatus and a touch sensing method thereof, wherein the touch sensing method reads the sensing signal of the particular sensing loop as the reference signal at an operation timing and detects the touch position according to the reference signal and the sensing signal, so as to compensate the variation of the electrical characteristics caused by the bending stress or the temperature variation and to improve the accuracy of the touch sensing of the touch apparatus. In order to make the disclosure more comprehensible, embodiments are described below as the examples to prove that the disclosure can actually be realized. Moreover, elements/components/method with same reference numerals represent same or similar parts in the drawings and embodiments.

FIG. 1A is a schematic diagram illustrating a touch apparatus according to an embodiment of the disclosure. Referring to FIG. 1A, the touch apparatus includes a touch panel 110 and a detection unit 120. In the present embodiment, the touch panel 110 may be the projected capacitive touch panel or the resistive touch panel, and may be the flexible touch panel fabricated on the flexible substrate. Moreover, the touch panel 110 and the detection unit 120 shown in the present disclosure may be disposed in the display apparatus (not illustrated) to form the touch display apparatus. That is to say, the touch display apparatus is constituted by combining the touch apparatus 100 and the display apparatus. The touch panel 110 includes at least one sensing loop, and a plurality of sensing loops TU11~TUmn (m and n are positive integers) arranged in a matrix form is taken as the example in the present embodiment, where the sensing loops TU11~TUmn are used for sensing whether an user touches the touch panel 110 or not (i.e. whether a touch event is occurred or not). The detection unit 120 is coupled to the touch panel 110 and configured to detect the touch position when the touch event is occurred, such that the touch apparatus 100 executes the corresponding operation or controls the display apparatus to display the corresponding image according to the touch position detected by the detection unit 120.

In the present embodiment, at least one of the sensing loops TU11~TUmn from a variation region of the touch panel 110 in advance is selected (for example, the sensing loop TUpq, where p and q are positive integers, $1\leq p\leq m$, $1\leq q\leq n$), and the selected sensing loop is defined as the reference sensing loop RU. The variation region is the region where the impedance value varies easily (such as a folded region) in the touch panel 110. Therefore, the touch apparatus 100 reads the reference signal DR corresponding to the impedance variation of the variation region from the reference sensing loop RU, so as to adjust the circuit parameter of the detection unit 120 according to the read reference signal DR and to calibrate the level of the sensing signal for compensating the variation of the electrical characteristics generated in the touch panel 110 in response to the affection of the bending stress and the temperature.

Figure 1B:
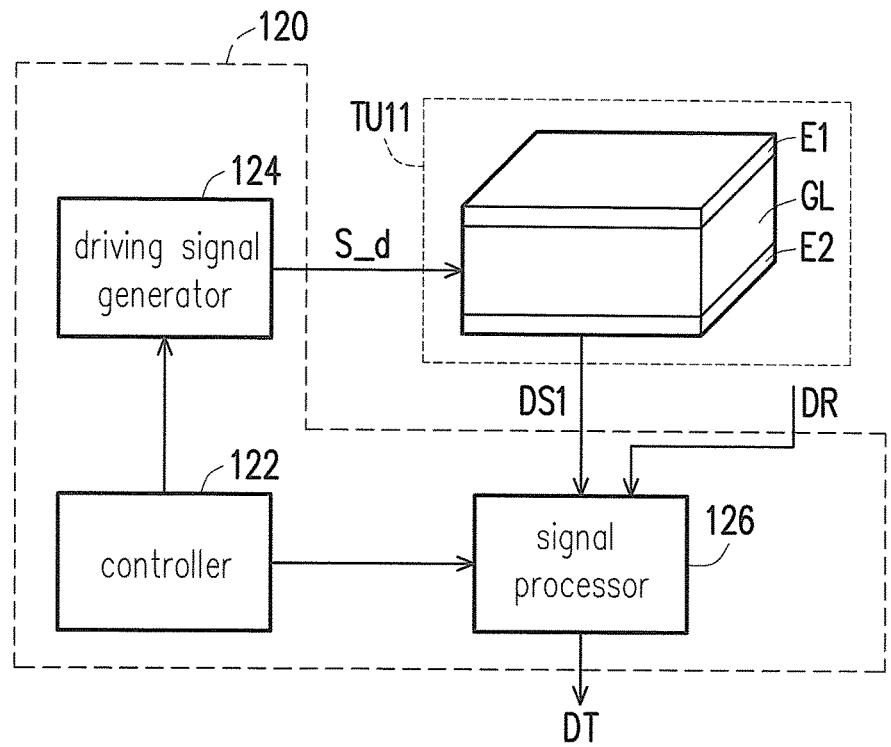
FIGS. 1B and 1C are schematic diagrams illustrating an operation of a touch apparatus according to different embodiments of the disclosure.
Figure 1C:
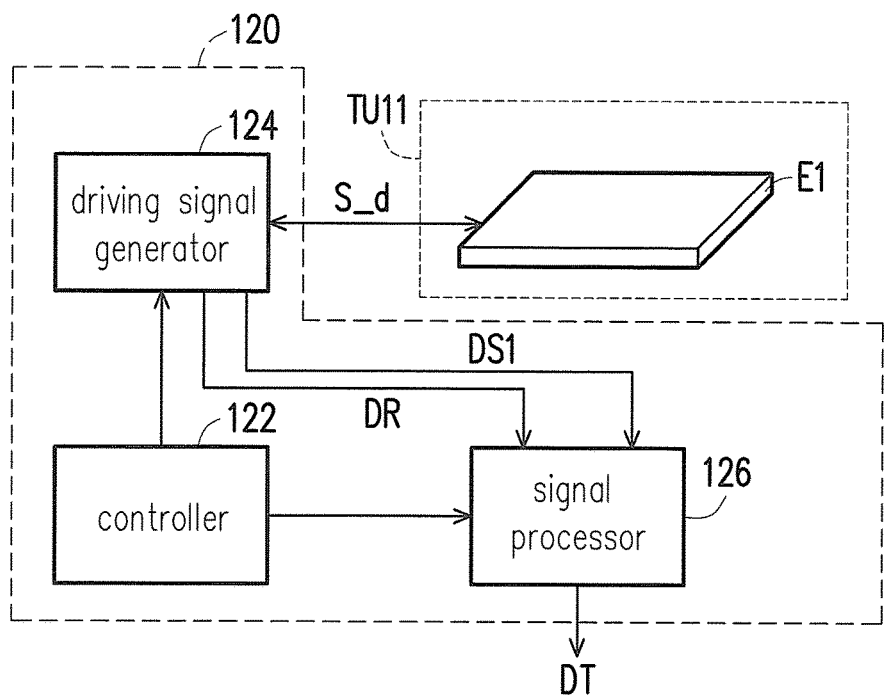

FIGS. 1B and 1C are schematic diagrams illustrating an operation of a touch apparatus according to different embodiments of the disclosure. FIG. 1B illustrates the embodiment of the touch panel 110 which is the mutual capacitive touch panel or the resistive touch panel. FIG. 1C illustrates the embodiment of the touch panel which is self-capacitive touch panel. Further, for convenience in explanation with the reference of FIGS. 1B and 1C, the sensing loop TU11 is taken as the example for explaining the touch sensing operation. The people skilled in the related art are able to obtain the touch sensing operations of other sensing loops TU12~TUmn in referring to the touch sensing operation of the sensing loop TU11.

Please refer to FIGS. 1A and 1B. In the present embodiment, the sensing loop TU11 of the touch panel 110 includes electrodes E1, E2 and a gap layer GL, and the detection unit 120 includes a controller 122, a driving signal generator 124 and a signal processor 126. The touch panel 110 in the present embodiment may be, for example, the mutual capacitive touch panel or the resistive touch panel. When the touch panel is the mutual capacitive touch panel, each of the sensing loops TU11~TUmn is constituted by coupling the electrically isolated electrodes E1 and E2 through the gap layer GL formed by insulation material. In another embodiment, each of the sensing loops TU11~TUmn is constituted by coupling two sets of the electrode strings through the gap layer GL formed by the insulation material, where each of the electrode strings includes a plurality of electrodes electrically connected together. The structure of the sensing loop is not limited to the examples shown in the disclosure.

When the touch panel 110 is the resistive touch panel, each of the sensing loop TU11~TUmn is constituted by coupling the electrically isolated electrodes E1 and E2 through the gap layer GL formed by the resistance material.

In the detection unit 120, the driving signal generator 124 is configured to generate a driving signal S_d. The signal processor 126 of the detection unit 120 generates a corresponding touch information DT according to the sensing signal DS1 and the reference sensing signal DR. The controller 122 is used to control the operations of the driving signal generator 124 and the signal processor 126.

When the touch apparatus 100 is operated in the touch sensing period, the driving signal generator 124 of the detection unit 120 outputs the driving signal S_d to the electrode E1 of the sensing loop TU11, so that the electrode E2 of the sensing loop TU11 generates the sensing signal DS1 in response to the driving signal S_d. Therefore, the signal processor 126 of the detection unit 120 reads the sensing signal DS1 of the sensing loop TU11 through a sensing channel corresponding to the electrode E2. When the touch apparatus is operated in the electrical detection period, the detection unit 120 provides the driving signal S_d to the reference sensing loop RU, where the reference sensing loop RU has the same structure as the sensing loop TU11. Therefore, according the aforementioned driving method of the sensing loop TU11, the reference sensing loop RU generates the reference signal DR in response to the driving signal S_d, so that the signal processor 126 of the detection unit 120 reads the reference signal DR through the corresponding sensing channel.

When the touch event is occurred at the sensing loop TU11, the impedance of the sensing loop TU11 is varied in response to the touch of the user (for example, the variation of the mutual capacitance of the electrodes E1 and E2, or the variation of the resistance of the electrodes E1 and E2), such that the sensing loop TU11 correspondingly generates the sensing signal DS1 with different levels (in comparing to the condition that the touch event is not occurred). The signal processor 126 of the detection unit 120 determines whether the sensing loop TU11 is touched or not according to the variations of the levels of the reference signal DR and the sensing signal DS1 read by the signal processor 126 of the detection unit 120, so as to generate the touch information DT corresponding to the touch position.

When the touch panel 110 is affected by the bending stress or the temperature variation, since the reference sensing loop RU and the sensing loops TU11~TUmn have similar impedance variations, the reference signal DR and the sensing signals DS1~DSn have the same level offset. As the result, by using the reference signal DR, the detection unit 120 compensates the level offset of the sensing signals DS1~DSn caused by the impedance variation, so as to correctly detect the touch position of the touch event. Further, the detection unit 120 adjusts the driving signal S_d provided to the touch panel 110 according to the reference signal DR read by the detection unit 120, so that the level of the reference signal DR reaches a predetermined range.

In an exemplary embodiment, the controller 122 of the detection unit 120 is set in accordance with the read reference signal DR in order to control at least one signal processing parameter of the signal processor 126 of the detection unit 120, and the at least one signal processing parameter is stored in the memory unit (not illustrated).

Therefore, the signal processor 126 of the detection unit 120 updates the original setting values according to the signal processing parameters stored in the memory unit, so as to adjust the levels of the received sensing signals DS1~DSn to compensate the level offset of the sensing signals DS1~DSn caused by the impedance variation. Also, the signal processor 126 of the detection unit 120 generates the touch information DT according to the adjusted sensing signals DS1~DSn.

The controller 122 of the detection unit 120 sets up at least one driving control parameter for controlling the driving signal generator 124 of the detection unit 120 according to the read reference signal DR, and stores the at least one driving control parameter in the memory unit. Thus, the driving signal generator 124 of the detection unit 120 updates the original setting values according to the driving control parameter stored in the memory unit, so as to adjust the provided driving signals S_d, and the level of the reference signal DR reaches the predetermined range.

Please referring to FIGS. 1A and 1C again, the present embodiment is different from the embodiment described in FIG. 1B at that the sensing loop TU11 of the touch panel 110 (for example, the self-capacitive touch panel) is constituted by the isolated electrode E1. The electrode E1 generates the sensing signal DS1 in response to the received driving signal S_d, and the sensing signal DS1 is outputted to the signal processor 126 of the detection unit 120. In another embodiment, each of the sensing loops TU11~TUmn is constituted by electrode strings which are configured by a plurality of electrodes electrically connected together. The configuration of the sensing loop is not limited to above description in the present disclosure.

In the present embodiment, when the touch event is occurred at the sensing loop TU11, the capacitance variation of the self-capacitance (the capacitance of the electrode E1 and ground) is generated at the electrode E1 in response to the touch of the user, and the electrode E1 correspondingly generates the sensing signal DS1 with different levels, so that the signal processor 126 of the detection unit 120 determines whether the sensing loop TU11 is touched according to the level variations of the read reference signal DR and the read sensing signal DS1. Apart from the description stated above, the driving method and the circuit structure of the driving apparatus in the present embodiment are the same as the driving method and the circuit structure shown in the embodiment of FIG. 1B, so the relevant description is not repeated herein again.

Figure 2:
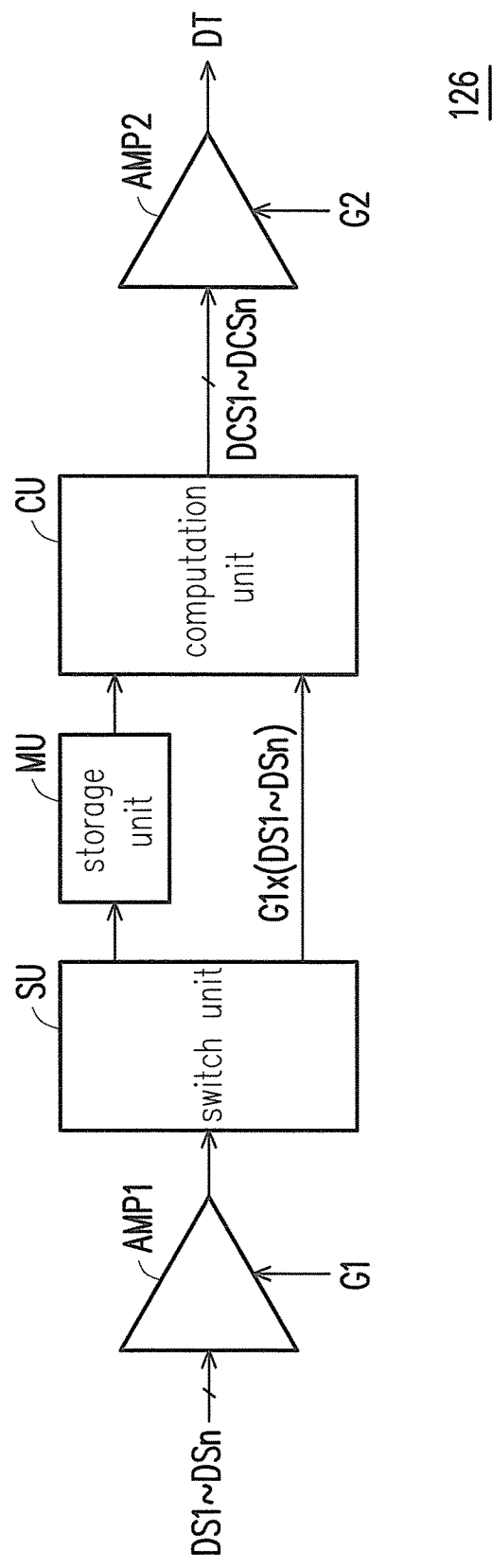
FIG. 2 is a schematic diagram illustrating a signal processor according to an embodiment of the disclosure.

In order to more clearly illustrate the embodiment of the present disclosure, the structure of the detection unit 120 shown in FIG. 2 may be used to implement the function of detecting the touch position of the touch event by applying the reference signal DR and the sensing signals DS1~DSn. Referring to FIGS. 1 and 2, the detection unit 120 includes the amplifiers AMP1, AMP2, the switch unit SU, the storage unit MU and the computation unit CU. Under the structure of the detection unit 120 shown in the present embodiment, the amplifier AMP1 adjusts the levels of the sensing signals DS1~DSn and the reference signals DR according to the computation gain G1, and the adjusted sensing signals DS1~DSn and the reference signal DR are outputted to the switch unit SU. The switch unit SU temporarily stores the reference signal DR received at the electrical detection period in the storage unit MU, and outputs the received sensing signals DS1~DSn to the computation unit CU when the operation timing of the touch apparatus 100 enters the touch sensing period. The computation unit CU computes the difference between the temporarily stored reference signal DR and the sensing signals DS1~DSn, so as to obtain a plurality of calibrated sensing signals DCS1~DCSn. Following that, the amplifier AMP2 outputs the touch information DT related to the touch position after adjusting the levels of the calibrated sensing signals DCS1~DCSn in accordance with the computation gain G2.

In the present embodiment, since communication processing parameters such as computation gains G1 and G2 are adjusted dynamically according to the variation of the reference signal DR, and the calibrated reference signals DCS1~DCSn are obtained from computing the differences between the reference signal DR and the sensing signals DS1~DSn, the impedance variations of the sensing loops TU11~TUmn caused by the bending or the temperature variation of the touch panel 110 is complemented. In other words, in the present embodiment, neither the resistance variation of a conductive layer caused by the bending or temperature, nor the impedance variation (for example, resistance or capacitance variations) caused by the change of the stacked structure is involved in the touch information DT. An identification rate of the touch sensing is improved effectively, and the mis-operation in response to the electrical variation caused by the bending of the touch panel 110 is avoided. The touch information generated by the detection unit 120 is related to the touch strength of the touch medium (such as finger).

Herein, the aforementioned structure of the detection unit 120 is only an example, and any of the circuit structure that may be used to compensate the impedance variation of the touch panel 110 according to the reference signal DR and the sensing signals DS1~DSn is capable of being applied in the touch apparatus 100 of the present application. In other words, the circuit structure of the detection unit 120 is not limited in the present disclosure.

In one embodiment, the digital or analog signal processing method can be chosen and applied by the designer regarding to the design need to achieve the structure of the detection unit 120 shown in FIG. 2, and it is not limited in the present disclosure. Further, a continuous-time filter can be added to the structure of the detection unit 120 by the designer if it is required to eliminate background noise, so as to improve the accuracy on touch position detection.

In the present embodiment, the sensing loop TUpq which is defined as the reference sensing loop RU can be regarded as same as the other sensing loops TU11~TUmn during the touch sensing period. In other words, within the touch sensing period, each of the sensing loops TU11~TUmn on the touch panel 110 is configured to sense the occurrence of the touch event.

Since the reference sensing loops RU are achieved by selecting one or more sensing loops from the sensing loops TU11~TUmn, the touch panel 110 does not require to configure an additional sensing element to be the reference sensing loop RU. That is to say, the touch apparatus 100 shown in the present embodiment is achieved by using the structure of a touch panel, so as to improve the design compatibility of the touch apparatus 100.

Figure 3A:
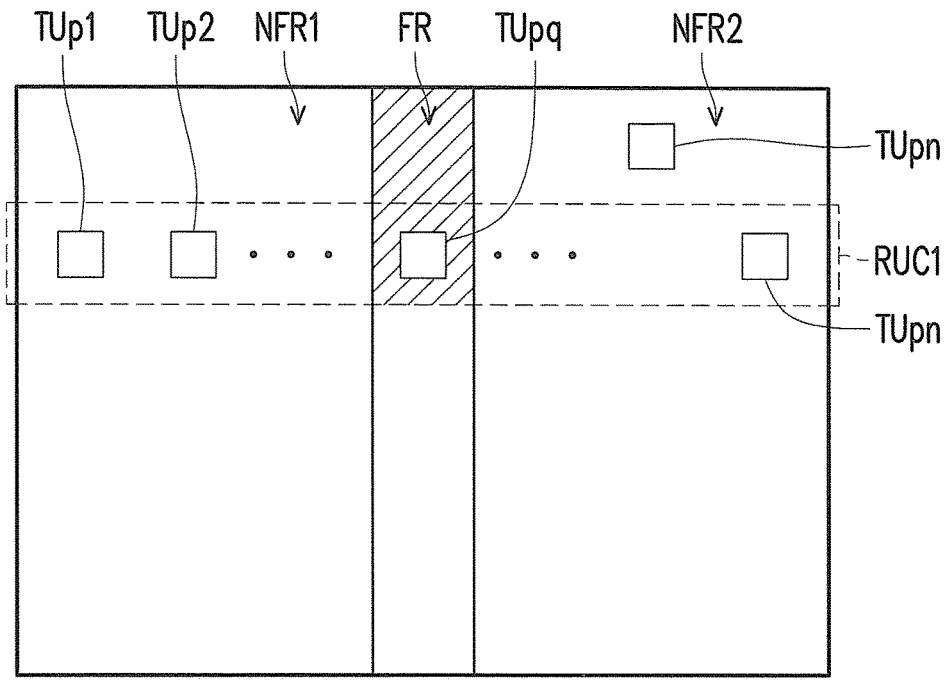
FIGS. 3A to 3C are schematic diagrams illustrating a touch panel according to different embodiments of the disclosure.
Figure 3B:
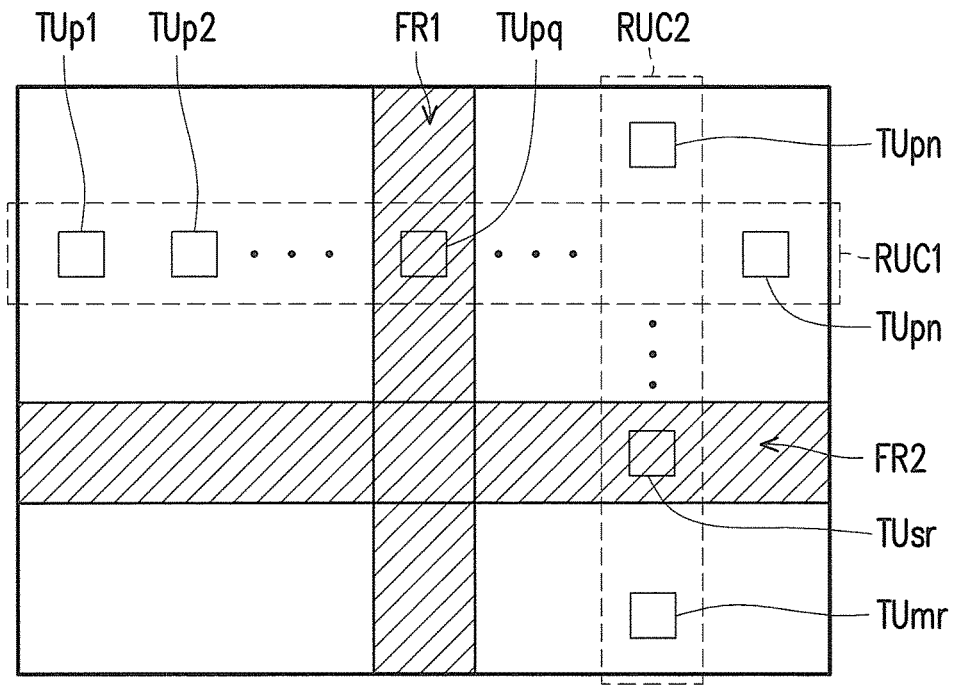
Figure 3C:
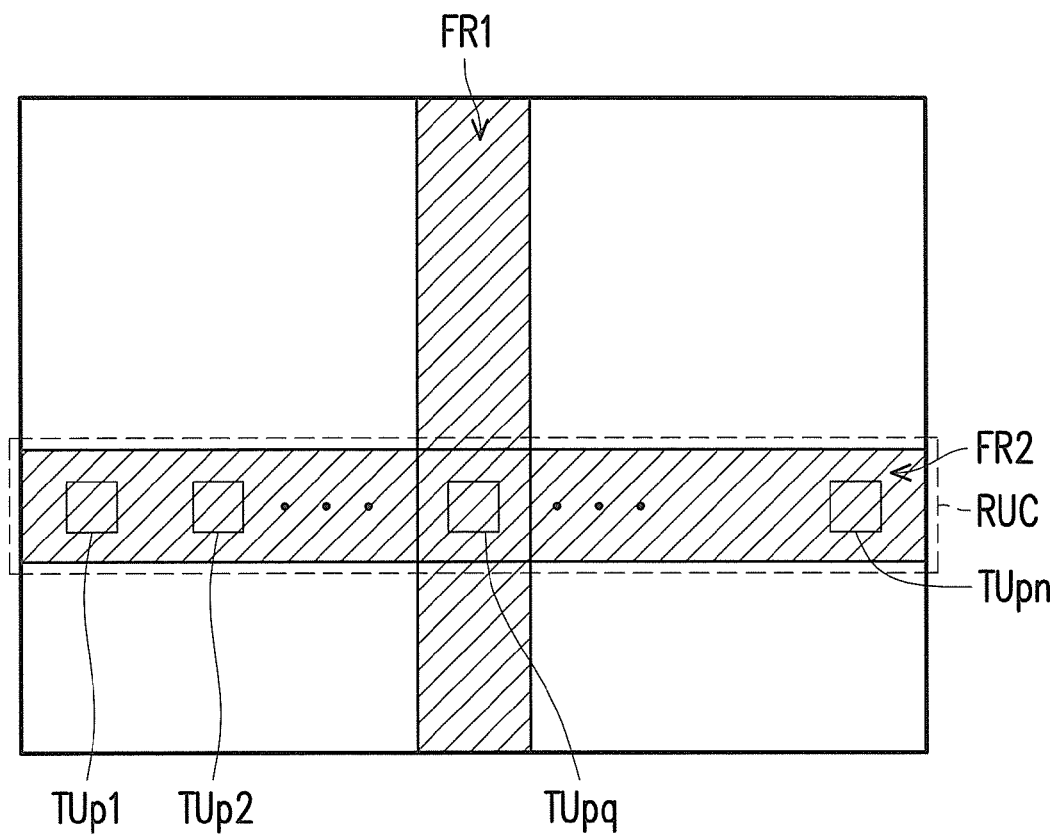

FIGS. 3A to 3C are schematic diagrams illustrating a touch panel according to different embodiments of the disclosure. In the present embodiment, the designer defines at least one of the sensing loops TU11~TUmn as the reference sensing loop according to the configuration status of the folded region of the touch panel 110. Taking FIG. 3A as the example, FIG. 3A is the schematic diagram illustrating the touch panel 110 having the folded region FR. The folded region FR is disposed along the Y axis direction. In FIG. 3A, the sensing channel formed by the sensing loops TUp1~TUpn are defined as a reference sensing channel RUC, wherein a portion of the sensing loops in the reference sensing channel RUC is disposed outside of the folded region FR (such as TUp1~TUpq−1 and TUpq+1~TUpn), and another portion of the sensing loops is disposed inside the folded region FR (such as TUpq). In the present embodiment, the designer may define a portion or whole of the sensing loops TUp1~TUpn in the reference sensing channel RUC as the reference sensing loop according to the design need, such that the detection unit (such as 120) reads the sensing signal of the reference sensing loop in the reference sensing channel RUC as the reference signal during the electrical detection period.

For example, in an exemplary embodiment, the sensing loops respectively located in non-folded regions NFR1, NFR2 and the folded region FR (such as TUp1, TUpq, and TUpn) in the reference sensing channel RUC are defined as the reference sensing loops by the designer. When the touch event is occurred in the non-folded region NFR1, the detection unit takes the sensing signal read from the reference sensing loop TUp1 of the non-folded region NFR1 as the reference signal; when the touch event is occurred at the folded region FR, the detection unit takes the sensing signal read from the reference sensing loop TUpq of the folded region FR as the reference signal; and when the touch event is occurred at the non-folded region NFR2, the detection unit takes the sensing signal read from the reference sensing loop TUpn of the non-folded region NFR2 as the reference signal. In another exemplary embodiment, all of the sensing loops TUp1~TUpq in the reference sensing channel RUC may be defined by the designer as the reference sensing loops, such that the detection unit reads the sensing signals of each sensing loops TUp1~TUpn in the reference sensing channel RUC as the reference signals during the electrical detection period. In another embodiment, only the sensing loop TUpq in the folded region is defined as the reference sensing loop by the designer, such that the detection unit reads the sensing signal of the sensing loop TUpq as the reference signal during the electrical detection period.

From the above-mentioned exemplary embodiments, as long as the detection unit compensates the affection on the sensing signal caused by the bending stress or the temperature variation according to the reference signal read from the reference sensing loop, the method of selecting the reference sensing loop (or the reference sensing channel) is not limited to the method described above in the present disclosure.

When the folded region FR is disposed along a different direction (such as X axis) on the touch panel 110, the selection method of the reference sensing channel RUC may be adaptively adjusted. In other words, at least one column or at least one row of the sensing loops on the touch panel 110 is defined as the reference sensing loop (reference sensing channel) by the designer according to the design need. The method of selecting the reference sensing channel is not limited to the aforementioned method in the present disclosure.

FIGS. 3B and 3C are the schematic diagrams illustrating the touch panel 110 having two folded regions FR1 and FR2, wherein the folded regions FR1 and FR2 are respectively disposed along the Y axis direction and the X axis direction. In FIG. 3B, the sensing channels formed by the sensing loops TUp1~TUpn and TU1r~TUmr are respectively defined as the reference sensing channels RUC1 and RUC2. Further, a portion of the sensing loops in the reference sensing channel RUC1 is located outside of the folded region FR1 (for example, TUp1~TUpq−1 and TUpq+1~TUpn), and another portion of the sensing loops is located inside of the folded region FR2 (such as TUpq). Similarly, a portion of the sensing loops in the reference sensing channel RUC2 is located outside of the folded region FR2 (for example, TU1r~TUs−1r and TUs+1r~TUmr, where r and s are positive integers, 1≤r≤n, 1≤s≤m), and another portion of the sensing loops is located inside of the folded region FR2 (such as TUsr). In the present embodiment, the designer may design a portion or all of the sensing loops TUp1~TUpn and TU1r~Tumr in the reference sensing channels RUC1 and RUC2 as the reference sensing loops according to the design need so that the detection unit (such as 120) reads the sensing signals of the reference sensing loops in the reference sensing channels RUC1 and RUC 2 as the reference signals during the electrical detection period. Based on such structure, no matter that the touch panel 110 is folded along the folded regions FR1 or FR2, the level offset of the sensing signal caused by the impedance variation is compensated by the detection unit using the corresponding reference signal, so as to correctly detect the touch position of the touch event.

In FIG. 3C, the sensing loops TUp1~TUpn are defined as the reference sensing channel RUC. Herein, each of the sensing loops TUp1~TUpn of the reference sensing channel RUC is located in the folded region FR2. The difference between the embodiments shown in FIGS. 3C and 3B is that, the sensing channel formed by the sensing loops TUp1~TUpn in the folded region FR2 is defined as the reference sensing channel RUC in the embodiment of FIG. 3C, and at least the sensing loop TUpq of the reference sensing channel RUC is selected to be the reference sensing loop. No matter that the touch panel is folded along the folded regions FR1 or FR2, under both conditions, the impedance variation is occurred in the sensing loop TUpq in response to the bending stress. Therefore, under the structure of the present embodiment, the reference signal read from the reference sensing loop in the reference sensing channel RUC is configured to compensate the sensing signal by the detection unit, and it is unnecessary to define another sensing channel as the reference sensing channel corresponding to the position of the folded region.

From the above embodiments shown in FIGS. 3A to 3C, the folded regions FR, FR1 and FR2 are the variation region where the impedance varies easily, and least one of the sensing loops passed through the variation region is defined as the reference sensing loop (such as TUpq, Tusr, TUp1~TUpn) during the electrical detection period by the designer according to the design need.

FIGS. 4 to 8 are the flowcharts respectively illustrating the touch sensing methods of the touch panel shown in different embodiments of the present disclosure. Wherein, the touch panel (such as 110) has a plurality of sensing loops (such as TU11~TUmn), and the sensing loops are configured to sense the touch of the user (i.e. sensing whether a touch even is occurred). In addition, the touch sensing apparatus for executing the touch sensing method shown in FIGS. 4 to 8 can be referred from the illustration of FIG. 1.

Figure 4:
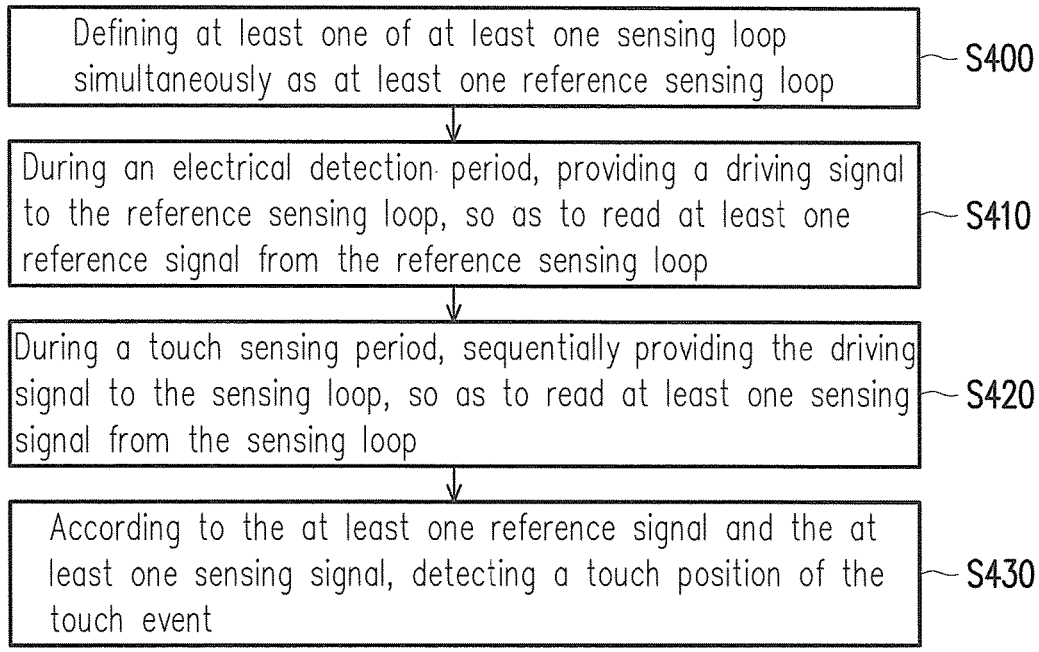
FIG. 4 is a flowchart illustrating a touch sensing method of a touch panel according to an embodiment of the disclosure.

FIG. 4 is a flowchart illustrating a touch sensing method of a touch panel according to an embodiment of the disclosure. Please referring to FIG. 4, at least one of at least one sensing loop is defined as at least one reference sensing loop (such as RU) (Step S400). Next, a driving signal is provided to the reference sensing loop during an electrical detection period, so as to read a reference signal from the reference sensing loop (Step S410), and the driving signal is provided to the sensing loop during the touch sensing period, so as to read the sensing signal from the sensing loop (Step S420). After reading the reference signal and the sensing signal, the touch apparatus (such as 100) is used to detect the touch position of the touch event according to the reference signal and the sensing signal (Step S430).

Figure 5:
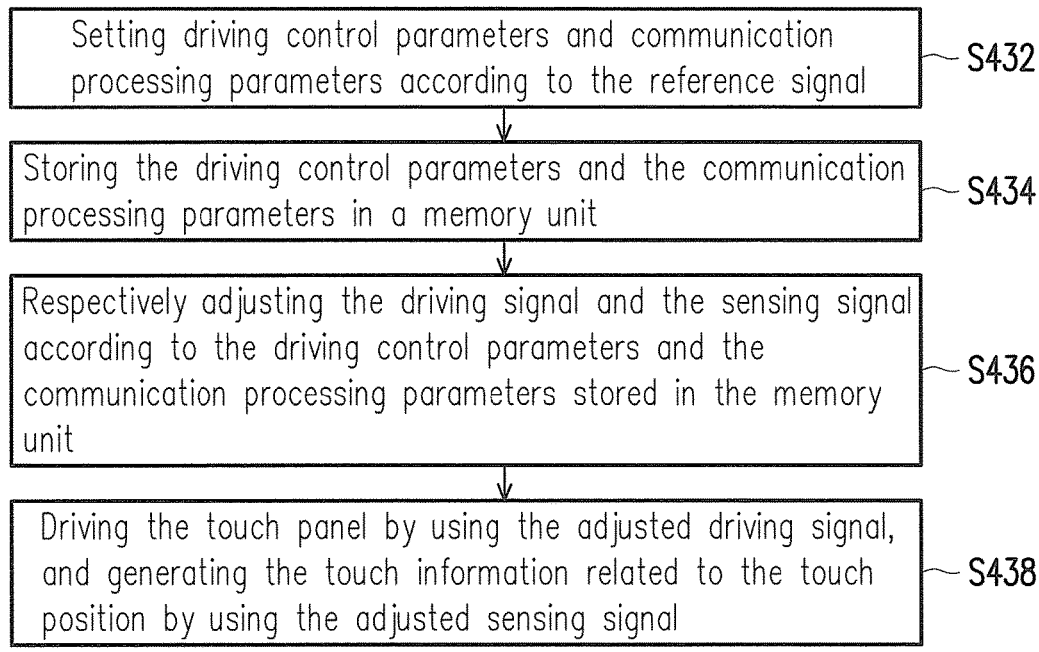
FIG. 5 is a flowchart illustrating the method of detecting a touch position of a touch event according to a reference signal and a sensing signal disclosed in an embodiment of the present disclosure.

The method of detecting the touch position of the touch event according to the reference signal and the sensing signal may be achieved by steps shown in FIG. 5, wherein FIG. 5 is a flowchart illustrating the method of detecting a touch position of a touch event according to a reference signal and a sensing signal disclosed in an embodiment of the present disclosure. Referring to FIG. 5, firstly, driving control parameters (such as the setting parameters of the driving signal generator) and communication processing parameters (such as the computation gains G1 and G2) are set according to the reference signal (Step S432), and the driving control parameters and the communication processing parameters are stored in the memory unit (Step 434). Next, the driving signal and the sensing signal are respectively adjusted according to the driving control parameters and the communication processing parameters stored in the memory unit (Step 436), and the adjusted driving signal and the adjusted sensing signal are respectively used for driving the touch panel and generating the touch information related to the touch position (Step 438).

Since the touch sensing mechanism within the electrical detection period and the touch sensing period are already taught by the embodiments shown in FIGS. 1 to 3C sufficiently, so the touch mechanism is not repeated herein. In the present disclosure, the touch sensing method may be implemented by the touch apparatus according to different timings, which includes (1) the reference signal is updated after each time of the deformation occurred on the touch panel (including folding and unfolding the touch panel), and the sensing signal is calibrated according to the updated reference signal; (2) the reference signal is updated at each time of turning on the touch panel and before displaying the image, and the sensing signal is calibrated according to the updated reference signal; and (3) the reference signal is updated before a new image program is activated, and the sensing signal is calibrated according to the updated reference signal. In the embodiment shown below, a further description to the operation timing on entering the electrical detection period and the touch sensing period is given.

Figure 6A:
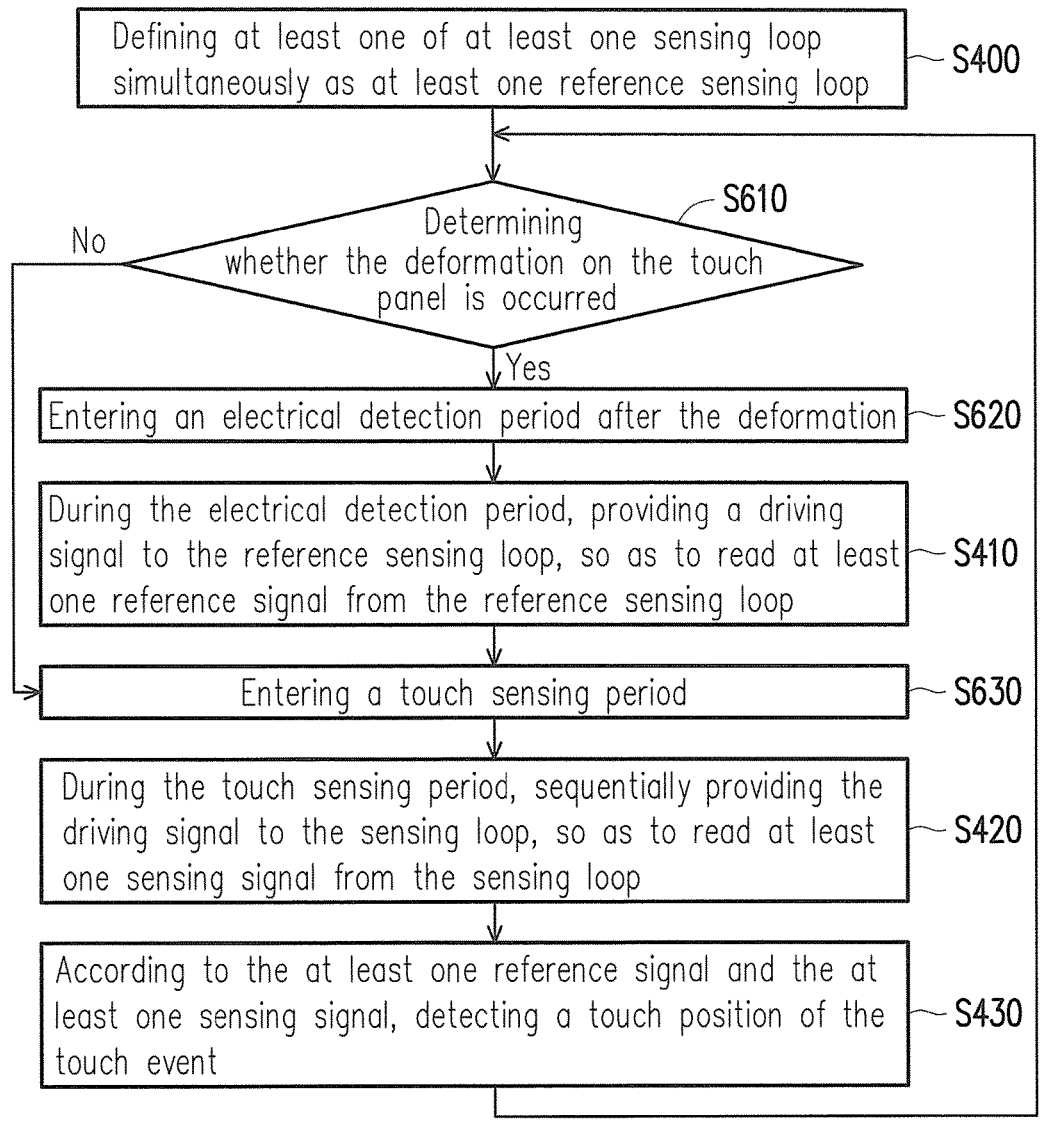
FIG. 6A is a flowchart illustrating a touch sensing method of a touch panel according to another embodiment of the disclosure.
Figure 6B:
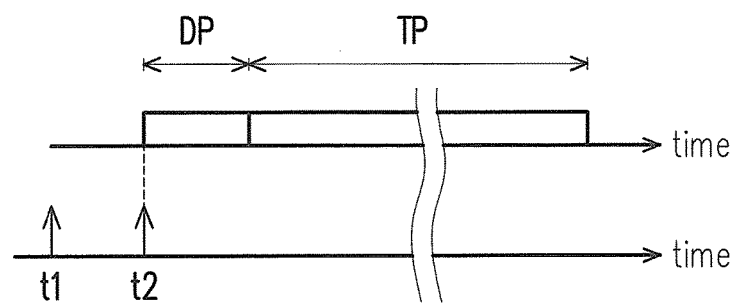
FIG. 6B is a timing diagram illustrating an operation timing of the touch apparatus shown in the embodiment of FIG. 6A.

FIG. 6A is a flowchart illustrating a touch sensing method of a touch panel according to another embodiment of the disclosure. FIG. 6B is a timing diagram illustrating an operation timing of the touch apparatus shown in the embodiment of FIG. 6A. In the present embodiment, whether the touch sensing method enters the electrical detection period is mainly determined by detecting whether the deformation is occurred on the touch panel (such as 110). Referring to FIG. 6A, after defining the reference sensing loop (Step S400), the touch apparatus (such as 100) executes the step of determining whether the deformation on the touch panel is occurred (Step 610), and the touch apparatus enters the electrical detection period after the deformation occurred on the touch panel is detected (Step S620). For example, as shown in FIG. 6B, when the touch apparatus detects that the touch panel in unfolded state begins to be folded at time t1, and the touch panel is folded to a folded state at time t2, the touch apparatus enters electrical detection period DP at the time t2 and executes the step S410 for obtaining the reference signal. Similarly, when the touch apparatus detects that the touch panel begins to be unfolded in the folded state at the time t1, and the touch panel is unfolded to an unfolded state at the time t2, the touch apparatus enters the electrical detection period DP at the time t2 and executes the step S402 for obtaining the reference signal.

When the electrical detection period DP is ended, the touch apparatus subsequently enters the touch sensing period TP (step S630), and executes the step S420 for obtaining the sensing signal. Therefore, the touch position of the touch event is detected by the touch apparatus according to the reference signal and the sensing signal (Step S430). From another view, when the touch panel does not detect the deformation on the touch panel, the touch panel directly enters the touch sensing period, so as to detect the touch position of the touch event according to the temporarily and previously stored reference signal and the present sensing signal. In other words, in the present embodiment, the touch apparatus updates the reference signal after each time of folding or unfolding the display panel, and the updated reference signal is used for calibrating the sensing signal.

Figure 7:
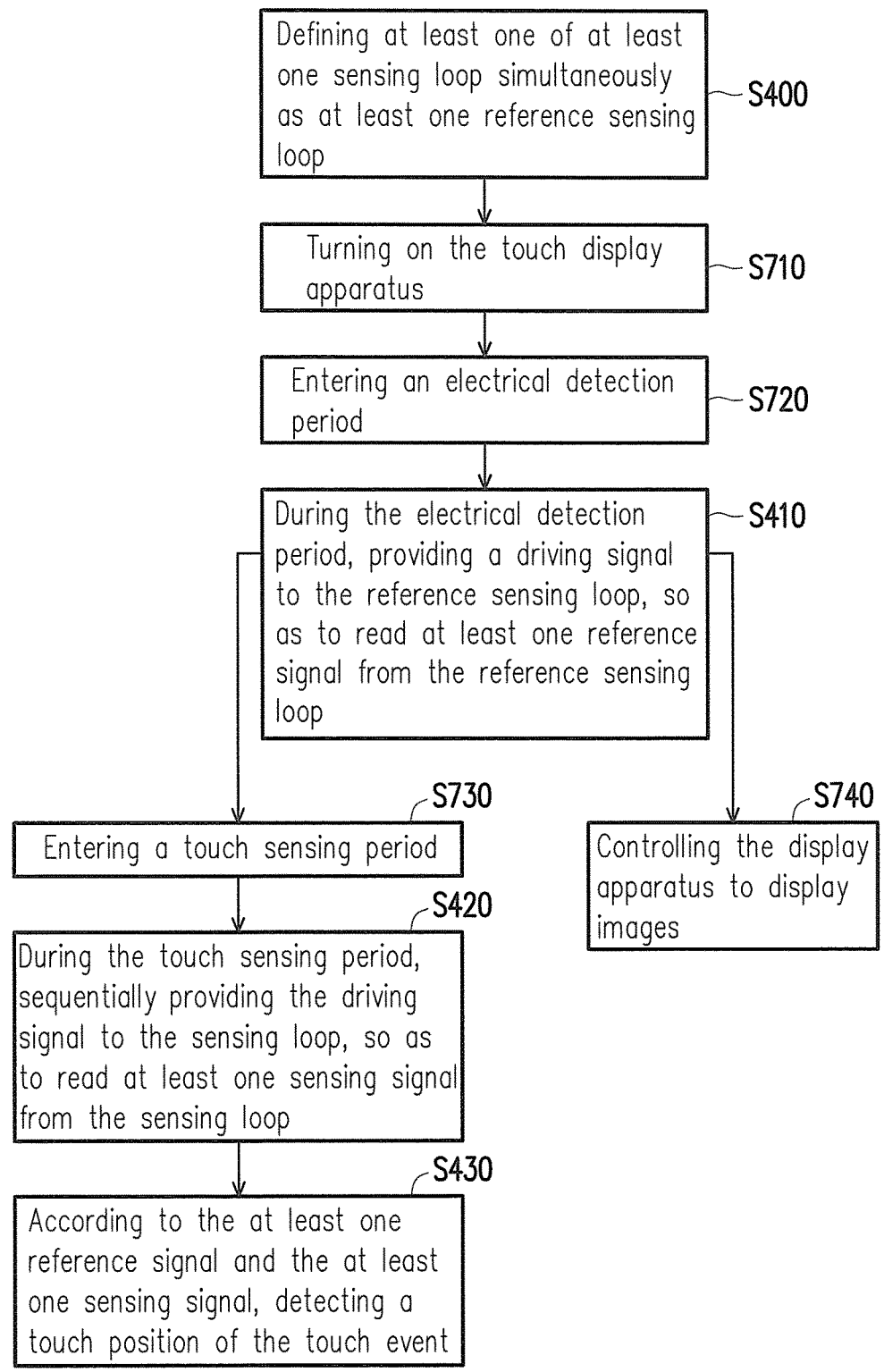
FIG. 7 is a flowchart illustrating a touch sensing method of a touch panel according to still another embodiment of the disclosure.

FIG. 7 is a flowchart illustrating a touch sensing method of a touch panel according to another embodiment of the disclosure. The touch sensing method in the present embodiment is mainly used by the touch displaying apparatus, wherein the touch displaying apparatus is constituted by the aforementioned touch apparatus (such as 100) combining with the display apparatus (not illustrated). In the present embodiment, after the touch display apparatus is powered and before the images are displayed, the touch sensing method enters the electrical detection period at initial stage, so as to read the reference signal from the reference sensing loop. Please referring to FIG. 7, after defining the reference sensing loop (Step S400) and turning on the touch display apparatus (step S710), the touch display apparatus enters the electrical detection period before displaying the images on the display apparatus (step S720), and executes the step S410 for obtaining the reference signal. When the electrical detection period DP is ended, the touch display apparatus subsequently enters the touch sensing period TP (step S730), and the display apparatus is controlled to display images (step S740). In other words, in the present embodiment, the touch display apparatus updates the reference signal at each time the touch display apparatus is turned on and before displaying the images, and further calibrates the sensing signal according to the updated reference signal.

Figure 8:
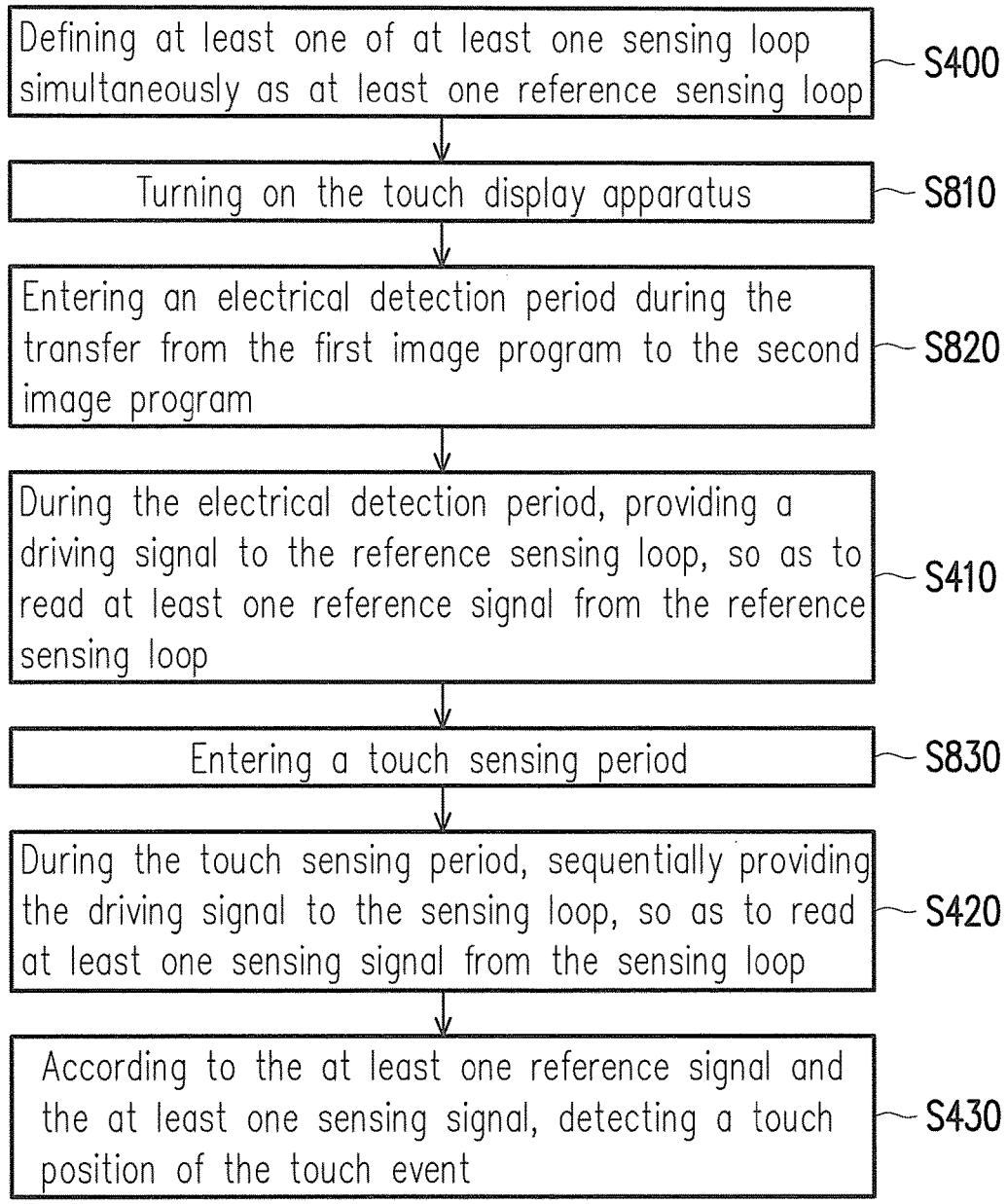
FIG. 8 is a flowchart illustrating a touch sensing method of a touch panel according to further another embodiment of the disclosure.

FIG. 8 is a flowchart illustrating a touch sensing method of a touch panel according to further another embodiment of the disclosure. The touch sensing method of the present embodiment is also used in the aforementioned touch display apparatus. In the present embodiment, the touch sensing method enters the electrical detection period according to the status of the displayed images after the touch display apparatus is turned on. Referring to FIG. 8, after defining the reference sensing loop (step S400) and turning on the touch display apparatus (step S810) the display apparatus displays the images according to the synchronous clock signal under the control of the display driving circuit (not illustrated). Herein, the touch display apparatus enters the electrical detection period during the transfer from the first image program to the second image program (step S820), so as to execute the step S410 for updating the reference signal during the transfer of the displayed images (such as the transfer between two displaying frames, or the transfer between the screen protection program and the displayed images). When the touch display apparatus determines that the displayed image of the display apparatus does not transfer from the first image program to the second image program, the step S840 is executed repeatedly.

In the step S410, the touch display apparatus may select to provide the driving signal to the reference sensing loop by cooperating the synchronous timing signal, or to provide the driving signal to the reference sensing loop according to a predetermined timing, so as to obtain the corresponding reference signal, so the method of providing the driving signal is not limited in the present disclosure.

After the electrical detection period DP is ended, the touch display apparatus subsequently enters the touch sensing period TP (step S830), and the step S430 is executed for obtaining the sensing signal. Therefore, the touch position of the touch event is detected by the touch display apparatus according to the reference signal and the sensing signal (step S430). In other words, in the present embodiment, touch display apparatus updates the reference signal before activating each new image program, and calibrates the sensing signal according to the updated reference signal.

In conclusion of the above, the present disclosure provides a touch apparatus and a touch sensing method, wherein the touch sensing method reads the sensing signal of the particular sensing loop as the reference signal during the electrical detection period to detect the touch position according to the reference signal and the sensing signal, such that the electrical variation of the touch panel caused by the bending stress or the temperature variation is compensated, so as to improve the accuracy of the touch sensing of the touch apparatus.

It will be apparent to those skilled in the art that various modifications and variations can be made to the structure of the disclosed embodiments without departing from the scope or spirit of the disclosure. In view of the foregoing, it is intended that the disclosure covers modifications and variations of this disclosure provided they fall within the scope of the following claims and their equivalents.

What is claimed is:

1. A touch sensing method of a touch panel, comprising:
    defining at least one of at least one sensing loop as at least one reference sensing loop, wherein the at least one sensing loop is disposed in the touch panel and configured to sense a touch event;
    detecting whether a deformation is occurred on the touch panel, wherein deformation of the touch panel includes folding, bending, and rolling of the touch panel;
    when the deformation occurred on the touch panel is detected, entering the electrical detection period after the deformation;
    during an electrical detection period, providing a driving signal to the at least one reference sensing loop, so as to read at least one reference signal from the at least one reference sensing loop;
    during a touch sensing period, providing the driving signal to the at least one sensing loop, so as to read at least one sensing signal from the at least one sensing loop; and
    detecting a touch position of the touch event by referring the at least one sensing signal to the at least one reference signal,
    wherein the electrical detection period and the touch sensing period are two separate periods.

2. The touch sensing method of the touch panel as claimed in claim 1, wherein the touch panel is a self-capacitive touch panel, and each of the sensing loops is constituted by an electrode or an electrode string including a plurality of electrodes electrically connected together.

3. The touch sensing method of the touch panel as claimed in claim 1, wherein the touch panel is a mutual capacitive touch panel, and each of the sensing loops is constituted by coupling two electrically isolated electrodes or two electrode strings respectively including a plurality of electrodes electrically connected together through an insulation material.

4. The touch sensing method of the touch panel as claimed in claim 1, wherein the touch panel is a resistive touch panel, and each of the sensing loops is constituted by coupling two electrically isolated electrodes through a resistance material.

5. The touch sensing method of the touch panel as claimed in claim 1, wherein the touch panel comprises at least one variation region, and the at least one of the sensing loops passed through the at least one variation region is defined as the at least one reference sensing loop during the electrical detection period.

6. The touch sensing method of the touch panel as claimed in claim 1, further comprising:
    during the electrical detection period, providing the driving signal to the at least one reference sensing loop.

7. The touch sensing method of the touch panel as claimed in claim 1, wherein the touch panel is disposed in a display apparatus to form a touch display apparatus, the touch sensing method further comprises:
    turning on the touch display apparatus; and
    entering the electrical detection period.

8. The touch sensing method of the touch panel as claimed in claim 1, wherein the touch panel is disposed in a display apparatus to form a touch display apparatus, the touch sensing method further comprises:
    turning on the touch display apparatus; and
    during a transfer of a displayed image of the touch display apparatus from a first image program to a second image program, entering the electrical detection period.

9. The touch sensing method of the touch panel as claimed in claim 8, wherein the display apparatus displays images according to a synchronous clock signal, and during the electrical detection period, the step of providing the driving signal to the at least one reference sensing loop comprises:
    providing the driving signal to the at least one reference sensing loop by cooperating the timing of the synchronous clock signal.

10. The touch sensing method of the touch panel as claimed in claim 8, wherein during the electrical detection period, the step of providing the driving signal to the at least one reference sensing loop comprises:
    providing the driving signal to the at least one reference sensing loop according to a predetermined timing.

11. The touch sensing method of the touch panel as claimed in claim 1, further comprising:
    setting at least one driving control parameter according to the at least one reference signal; and
    storing the at least one driving control parameter in a memory unit.

12. The touch sensing method of the touch panel as claimed in claim 11, further comprising:
    adjusting the driving signal according to the at least one driving control parameter stored in the memory unit, so that a level of the at least one reference signal achieves a predetermined range.

13. The touch sensing method of the touch panel as claimed in claim 1, further comprising:
    setting at least one signal processing parameter according to the at least one reference signal; and
    storing the at least one signal processing parameter in a memory unit.

14. The touch sensing method of the touch panel as claimed in claim 13, further comprising:

adjusting the sensing signal according to the at least one signal processing parameter stored in the memory unit; and generating a touch information related to the touch position according to the adjusted sensing signal.

15. A touch apparatus, comprising:

a touch panel, comprising at least one sensing loop, wherein the at least one sensing loop is configured to sense a touch event, and at least one of the at least one sensing loop is defined as at least one reference sensing loop; and a detection unit, coupled to the touch panel and configured to detect a touch position of the touch event, wherein the detection unit detects whether a deformation is occurred on the touch panel, when the deformation occurred on the touch panel is detected by the detection unit, the touch apparatus enters the electrical detection period after the deformation, wherein deformation of the touch panel includes folding, bending, and rolling of the touch panel, wherein when the touch apparatus is operated in an electrical detection period, the detection unit provides a driving signal to the at least one reference sensing loop, so as to read at least one reference signal from the at least one reference sensing loop, and when the touch apparatus is operated in a touch sensing period, the detection unit provides the driving signal to the at least one sensing loop, so as to read at least one sensing signal from the at least one sensing loop, wherein the detection unit detects the touch position of the touch event based on by referring the at least one sensing signal to the at least one reference signal, wherein the electrical detection period and the touch sensing period are two separate periods.

16. The touch apparatus as claimed in claim 15, wherein the touch panel is a self-capacitive touch panel, and each of the sensing loops is constituted by an electrode or an electrode string including a plurality of electrodes electrically connected together.

17. The touch apparatus as claimed in claim 15, wherein the touch panel is a mutual capacitive touch panel, and each of the sensing loops is constituted by coupling two electrically isolated electrodes or two electrode strings respectively including a plurality of electrodes electrically connected together through an insulation material.

18. The touch apparatus as claimed in claim 15, wherein the touch panel is a resistive touch panel, and each of the sensing loops is constituted by coupling two electrically isolated electrodes through a resistance material.

19. The touch apparatus as claimed in claim 15, wherein the touch panel comprises at least one variation region, and the at least one of the sensing loops passed through the at least one variation region is defined as the at least one reference sensing loop during the electrical detection period.

20. The touch apparatus as claimed in claim 15, wherein the touch apparatus provides the driving signal to the at least one reference sensing loop during the electrical detection period.

21. The touch apparatus as claimed in claim 15, wherein the touch panel is combined with a display apparatus to form a touch display apparatus, and when the touch display apparatus is turned on, the touch display apparatus enters the electrical detection period.

22. The touch apparatus as claimed in claim 15, wherein the touch panel is combined with a display apparatus to form a touch display apparatus, when the touch display apparatus is turned on, and during a transfer of a displayed image from a first image program to a second image program, the touch display apparatus enters the electrical detection period.

23. The touch apparatus as claimed in claim 22, wherein the display apparatus displays images according to a synchronous clock signal, and the detection unit provides the driving signal to the at least one reference sensing loop by cooperating the timing of the synchronous clock signal.

24. The touch apparatus as claimed in claim 22, wherein the detection unit provides the driving signal to the at least one reference sensing loop according to a predetermined timing.

25. The touch apparatus as claimed in claim 15, wherein during the electrical detection period, the detection unit sets at least one driving control parameter according to the at least one reference signal and stores the at least one driving control parameter in a memory unit.

26. The touch apparatus as claimed in claim 25, wherein the detection unit adjusts the driving signal according to the at least one driving control parameter stored in the memory unit, so that a level of the at least one reference signal achieves a predetermined range.

27. The touch apparatus as claimed in claim 15, wherein during the touch sensing period, the detection unit sets at least one signal processing parameter according to the at least one reference signal, and stores the at least one signal processing parameter in a memory unit.

28. The touch apparatus as claimed in claim 27, wherein during the touch sensing period, the detection unit adjusts the sensing signal according to the at least one signal processing parameter stored in the memory unit and generates a touch information related to the touch position according to the adjusted sensing signal.

29. A touch sensing method of a touch panel, comprising:

defining at least one of at least one sensing loop as at least one reference sensing loop, wherein the at least one sensing loop is disposed in the touch panel and configured to sense a touch event, wherein when the touch event is occurred in a non-folded region of the touch panel, the at least one reference sensing loop is selected from the non-folded region, and wherein when the touch event is occurred in a folded region of the touch panel, the at least reference sensing loop is selected from the folded region;

during an electrical detection period, providing a driving signal to the at least one reference sensing loop, so as to read at least one reference signal from the at least one reference sensing loop;

during a touch sensing period, providing the driving signal to the at least one sensing loop, so as to read at least one sensing signal from the at least one sensing loop; and detecting a touch position of the touch event by referring the at least sensing signal to the at least one reference signal, wherein the electrical detection period and the touch sensing period are two separate periods.

* * * * *